United States Patent

[11] 3,604,073

[72] Inventor Harold Green
    171 S. Vista St., Los Angeles, Calif. 90036
[21] Appl. No. 30,388
[22] Filed Apr. 21, 1970
[45] Patented Sept. 14, 1971

[54] RELEASABLE FASTENER ASSEMBLY FOR WEBBING MATERIALS
    8 Claims, 6 Drawing Figs.
[52] U.S. Cl. .................................................. 24/265 C, 160/404
[51] Int. Cl. ..................................................... A47c 31/00
[50] Field of Search ........................................... 160/398, 404, 383; 24/265 H, 265 C

[56] References Cited
    UNITED STATES PATENTS
2,878,861  3/1959  Molla ........................ 160/404 X
2,966,206  12/1960 Hartman .................... 160/402
3,086,541  5/1963  Lockshin .................... 24/265 C X FOREIGN PATENTS
216,170  7/1961  Austria ....................... 160/402

Primary Examiner—Donald A. Griffin
Attorney—Robert Brown, Jr.

ABSTRACT: A releasable self-retaining means for fastener assemblies employing a U-shaped spring hook for attaching a webbing material to a slotted or perforated frame. The self-retaining means consists of a three-point frictional contact produced between the hook legs and the frame in response to the spring resiliency and while the hook slides to and from latched position. Cam means at the free end of one of the hook legs initially guides the hook into the three-point contact as the latter moves toward latched position, and a second cam means at the opposite end of the leg initially guides the hook into the three-point contact when the hook moves reversely from latched position.

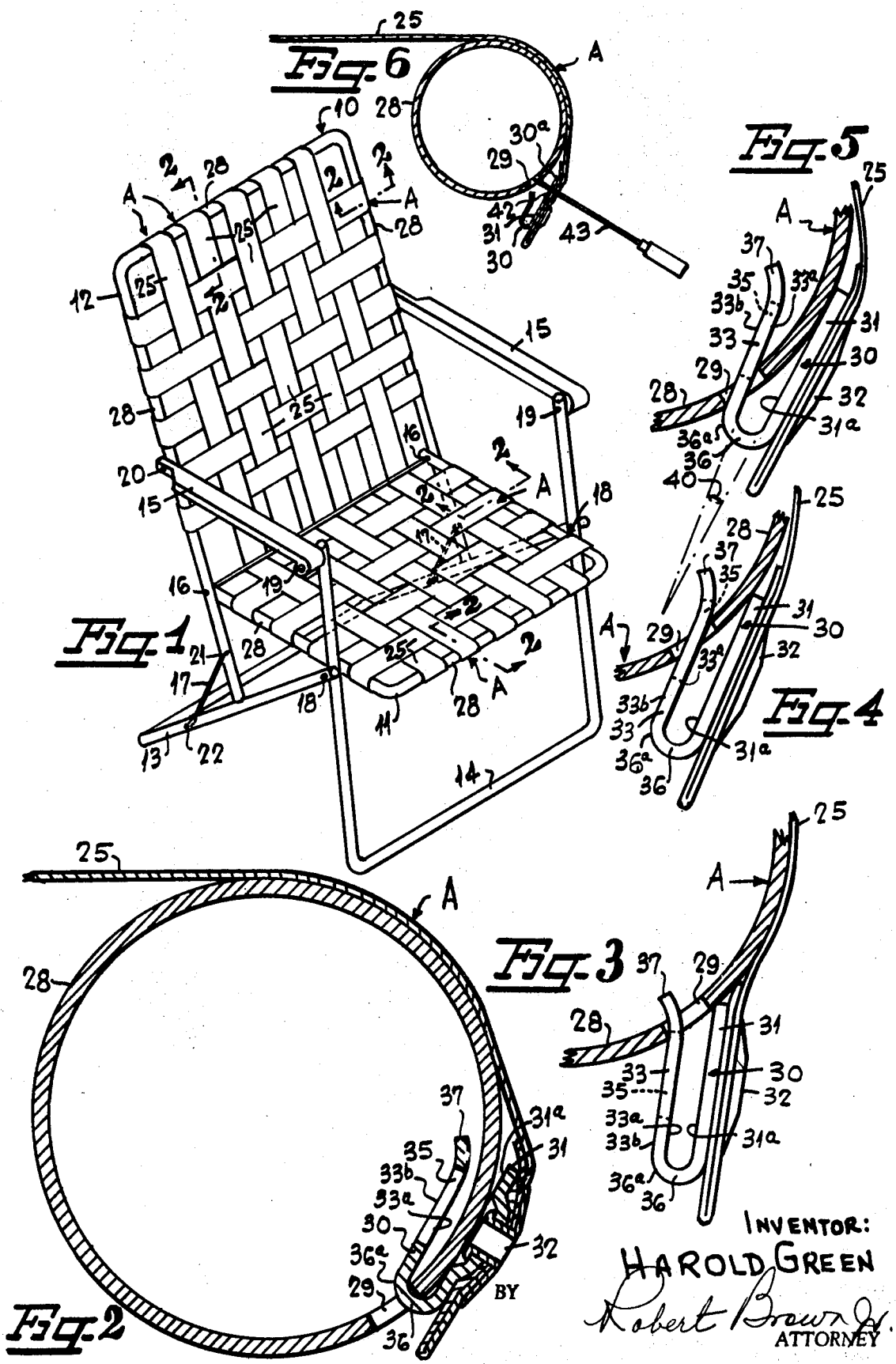

3,604,073

RELEASABLE FASTENER ASSEMBLY FOR WEBBING MATERIALS

This invention relates to fasteners and more especially to a hook-type fastener assembly employed in the construction of lawn chairs, litters, waiter tray stands, seat belts and the like, to releasably secure webbing materials to a rigid frame.

Heretofore, various types of hook-type fasteners have been devised, typical examples of which are disclosed in U.S. Pat. Nos. 2,845,671 and 2,878,861. Such prior art fasteners have not proven entirely satisfactory due, in part, to the ease in which detachment becomes effective when the webbing material becomes slack or untensioned.

It is therefore an object of this invention to provide a fastener assembly consisting of a spring hook adapted to be releasably latched in a slot or perforation of a frame, wherein the inherent spring resiliency of the hook effects a frictional resistance yieldably resisting movement of the hook to or from latched position thereby providing self-retaining means for holding the hook in latched position.

It is another object of this invention to provide a fastener assembly of the type described in the immediately preceding paragraph wherein cam means is provided on the terminal end of one of the hook legs for initially guiding it into frictional contact with opposed edges of the perforation, and wherein a second cam means is provided at the other end of the leg for relieving the frictional contact concurrently with latching the hook in position.

It is a further object of this invention to provide a fastener assembly of the class described in which a snap action accompanies the release of the hook from frictional engagement with the perforation and frame into a releasable fully latched position.

It is still another object of this invention to provide a fastener assembly of the hook-type which is simple in construction, easy to operate, economical to manufacture, dependable, and of low manufacturing cost.

Some of the objects of invention having been stated, other objects will appear as the description proceeds when taken in connection with the accompanying drawings, in which, FIG. 1 is an isometric view of a collapsible lawn chair embodying my invention;

FIG. 2 is an enlarged sectional view taken along lines 2—2 in FIG. 1, showing a fastener assembly consisting of a perforated tubing and a U-shaped spring hook, said assembly being in latched position;

FIG. 3 is a fragmentary sectional view similar to FIG. 2, but showing the position of the hook relative to the frame perforation preparatory to connecting the assembly;

FIG. 4 is a sectional view similar to FIG. 3, but showing the hook farther inserted to an initial three-point contact with the frame;

FIG. 5 is a view similar to FIG. 4, but showing the hook inserted still farther in the three-point contact and being held in such position by the inherent spring pressure of the hook, and FIG. 6 is a slightly modified form of the fastener assembly, showing a method of connecting the parts.

My fastener assembly is illustrated in association with a collapsible lawn chair 10 (FIG. 1); however, it is apparent that numerous other applications are possible, such as in litters, waiter tray stands, seat belts, and other types of furniture.

Referring more particularly to the drawings, the collapsible lawn chair 10 consists of U-shaped frames 11, 12, 13 and 14, arm rests 15, pivot rod 16, and pivot links 17, said members 11 through 17 being pivotally connected to one another as at 18, 19, 20, 21 and 22 in a conventional manner as more fully described in my prior U.S. Pat. No. 3,438,099, issued Apr. 15, 1969.

The U-frames 11 and 12 and the dividing pivot rod 16 define the respective borders of the chair seat and back which, in turn, are covered with panels of interlaced webbing straps 25. Although interlaced straps are shown, it will be readily understood that many other types of sheet materials may be employed.

It will be noted further that one set of the straps 25 extend transversely of the bottom and back panels and therefore remain in an installed tensioned state between fixed points, whereas, the set of straps 25 extending at right angles to the first set have their ends secured to spaced relatively movable points. Thus the latter set of straps 25 are held in a tensioned state only when the chair is erect. Since the present invention has self-retaining means for anchoring a hook in a slot to fasten the webbing to a frame, strap tension is not required to hold the fastener assembly in connected position.

The seat and back U-frames 11 and 12 are preferably made of a plate material which may assume various cross-sectional shapes such as sheet tubing, angles, channels, rectangular bar and the like.

Each end of each of the straps 25 of chair 10 is secured to a U-frame 11 or 12 by means of a fastener assembly according to my invention and broadly designated by the reference character A (FIGS. 2–5). More specifically, the assembly A comprises a U-shaped spring hook 30 having one of its legs 31 secured to the end of strap 25 by means of rivet 32, the other leg 33 of the hook being adapted to releasably fit in a slot or perforation 29 in tubing 28 as shown in FIG. 2. The leg 33 is apertured as at 35 to facilitate the driving of rivet 32.

Legs 31 and 33 normally assume substantially parallel positions when the hook 30 is latched as shown in FIG. 2 and prior to insertion or connection as shown in FIG. 3. In the positions intermediate those shown in FIGS. 4 and 2, however, the legs assume divergent positions under spring tension, as will be more fully explained hereinafter.

The intermediate portion of leg 33 is substantially straight, one end of said leg being integrally joined to leg 31 as at 36 and the other end terminating in a flared lip or extension 37. The straight inner and outer surfaces of leg 33 are designated by reference characters 33a and 33b respectively, and the inner surface of leg 31 by reference character 31a. The junction 36 is provided with a relatively sharp cam surface 36a tangentially related to the above-mentioned outer straight surface 33b of leg 33.

FIG. 3 shows the initial position of hook 30 relative to perforation 29 when connecting the assembly A. In the initial position, a two-point engagement or contact with tubing 28 is established, at which time the lip 37 or leg 33 penetrates perforation 29 and the end of leg 31 rests upon the outer surface of tubing 28. When moved inwardly to the position shown in FIG. 4, a three-point contact is established between the hook and the tubing, that is, the inner and outer leg surfaces 33a and 33b respectively contact the oppositely disposed edges of perforation 29 and concurrently, the end of parallel leg 31 continues to contact the outer surface of the tubing. Still further inward movement of spring hook 30 while in the three-point contact will spread the hook legs 31 and 33 transversely under spring tension to divergent angular positions as shown in FIG. 5 in which an angle 40 is formed therebetween. The spring tension pressure at the three points of contact will correspondingly increase the frictional resistance to the sliding movement of the hook during insertion and until the point of tangency between the leg surface 33b and junction surface 36a rests upon the edge of perforation 29 as shown in FIG. 5.

Inward movement of hook 30 beyond the position shown in FIG. 5 brings the relative sharp arcuate cam surface 36a into contact with the edge of perforation 29 to effect a quick release of the three-point contact and the resulting frictional pressure upon the tubing, thereby causing the hook to assume the unstressed latched position shown in FIG. 2.

When disconnecting assembly A, external force is applied to move hook 30 reversely from its latched position. During the reverse movement, the cam surface 36a will initially guide the hook into the three-point frictional contact previously described. As heretofore stated, the three-point frictional contact offers sufficient resistance to hook movement to prevent accidental separation from the assembly, but will yield to moderate externally applied force to permit separation.

FIG. 6 shows a slightly modified form of the invention in which the leg 31 of hook 30 is provided with an extension 30a having a perforation 42 therein. During attachment of the webbing strap 25 and hook 30 to tubing 28, a pointed tool or lever 43 is caused to penetrate the webbing 25 and perforations 29 and 42, after which the lever is rotated to properly position the lip 37 of the hook 30 for insertion.

I claim:

1. A fastener assembly for webbing materials comprising a U-shaped spring hook, means securing one leg of said hook to said material, an elongated plate member having a transverse perforation therethrough, means responsive to the spring action of said hook upon insertion of the other hook leg into said perforation for yieldingly pressing the inner and outer surfaces of the latter leg into frictional sliding engagement with oppositely disposed edges of said perforation, respectively, and means operable subsequent to the operation of said second means for relieving said frictional engagement to releasably latch said hook in anchored position, whereby said frictional engagement will yieldingly resist movement of the hook to and from its anchored position.

2. A fastener assembly as defined in claim 1 wherein said second means further includes interengaging means between said plate and said first leg for diverging the free end of the latter relative to the inserted leg.

3. A fastener assembly as defined in claim 2 wherein said third means includes a cam surface substantially at the junction of said legs and forming a continuation of said outer frictionally engaged outer leg surface.

4. A fastener assembly as defined in claim 3 wherein the leading insertion end of said other leg is provided with a flared extension normally diverging relative to the axis of said first leg.

5. A fastener assembly as defined in claim 1 wherein said third means includes a cam surface substantially at the junction of said legs and forming a continuation of said outer frictionally engaged outer leg surface.

6. A fastener assembly as defined in claim 5 wherein the leading insertion end of said other leg is provided with a flared extension normally diverging relative to the axis of said first leg.

7. A fastener assembly as defined in claim 1 wherein said other leg is substantially S-shaped and consists of a straight shank portion having reversely bent end portions, one of said end portions forming a junction between said legs.

8. A fastener assembly as defined in claim 7 wherein said third means includes a cam surface on said last-named leg end portion, said cam surface forming a continuation of the frictionally engaged outer surface of the latter.